Patented May 8, 1934

1,958,402

UNITED STATES PATENT OFFICE 1,958,402

PROCESS OF TREATING ACID SLUDGE

Ingenuin Hechenbleikner, Charlotte, N. C., assignor to Chemical Construction Corporation, Charlotte, N. C., a corporation of Delaware No Drawing. Application February 16, 1932, Serial No. 593,424

8 Claims. (Cl. 23—177)

This invention relates to a method of treating acid sludge obtained in the refining of petroleum, tar and other organic materials, and relates more particularly to an improved method for producing sulphurous acid gas and an acid-free fuel from acid sluldge; and has special reference to the provision of improvements in the process of treating sludge set forth in my co-pending applications Serial No. 568,050, filed Oct. 10, 1931; Serial No. 571,775, filed Oct. 29, 1931; and Serial No. 574,244, filed Nov. 11, 1931.

In the process set forth in my said copending applications, acid sludge is subjected in a retort to the action of heat so that the organic matter of the sludge is made to react with the sulphuric acid or/and compounds thereof in the sludge to convert the same to $SO_2$ gas which is removed from the sphere of reaction. By the reaction, the sulphuric acid and compounds thereof in the sludge are reduced to an $SO_2$ gas substantially free of impurities which is produced in such a condition that it may be readily and efficiently converted in contact or catalytic apparatus to sulphuric anhydride and sulphuric acid. In addition to the obtaining of the $SO_2$ product, there results the production of a granular carbonaceous residue of an acid-free character having a high volatile content which forms a very desirable fuel product.

As set forth in my said copending applications, particularly in my application Serial No. 571,775, the process of my invention is applicable to various kinds of sludges, including not only liquid and more viscous types of sludges, but also sludges of the heavier and more solid types and to sludges which are obtained by blending different kinds of sludges. I have discovered that the reaction that takes place in the retort, whatever the character of the sludge may be, is one between the sulphuric acid and certain of its compounds in the sludge and hydrocarbons in the sludge which furnish the hydrogen required for the reduction of the sulphuric acid. More specifically, I have empirically ascertained that if the sludge contains a disproportion of the reactable hydrocarbon and sulphuric acid components in the sludge, the reaction is retarded, resulting in a number of objections hereinafter set forth more in detail, and I have furthermore discovered that these objections may be cured and obviated and the reaction accelerated by adjusting the ratio between the reactable hydrocarbons and sulphuric acid or/and compounds thereof in the sludge.

The prime object of my present invention therefore comprises the provision of an improved method for treating acid sludge wherein the reactable components of the sludge which directly effect the reduction of the sulphuric acid and compounds thereof to $SO_2$ and the production of an acid-free fuel are adjusted or balanced.

To the accomplishment of this object and such other objects as may hereinafter appear, my invention consists in the processes and the steps of the processes hereinafter more particularly described and sought to be defined in the claims.

It will become manifest, as the description of the invention proceeds, that the principles of my present invention are applicable to various processes of treating the sludge wherein the reactable hydrocarbon and sulphuric acid components in the sludge are caused to react to effect the reduction of the sulphuric acid component and that such processes may include, for example, the heating of the sludge by either direct or indirect methods or treatments. The description of the present invention in connection with a preferred method of treating the sludge by subjecting the same to the action of hot combustion gases is therefore given herein by way of exemplification of the use and the many advantages of the present improvements, and not by way of limitation thereof.

In the process of treating acid sludge set forth in my aforesaid copending applications, a body of acid sludge is subjected in a retort to the action of hot combustion gases. In the practice of this process the reacting constituents of the sludge and the reacting conditions are so controlled as to generate $SO_2$ gas without producing such side reactions as result in the cracking or distillation of the heavy hydrocarbons, the destructive distillation of the carbonaceous residue, the distillation of sulphur, $SO_3$ or sulphuric acid, the generation of carbon monoxide or carbon dioxide gases, the ultimate formation or inclusion with the removed $SO_2$ gas of $H_2S$ gas, or the formation of dust, the reaction being, moreover, so carried out as to limit the formation to the minimum amount of the lighter hydrocarbons by distillation. Because of this, there results, as aforementioned, the production of an $SO_2$ product substantially free of impurities and of a granular sludge residue in the form of a very desirable fuel of an acid-free character having a high volatile content.

In the preferred practice of this process, the hot combustion gases are caused to flow over a sludge body in an elongated drum-shaped retort, which sludge body is agitated during and by the rotation of said retort, the hot combustion gases and the sludge body being brought into direct contact with each other by movement in generally countercurrent directions. The reaction gases produced in the retort are preferably withdrawn or expelled from the retort at one end of the same and at which end feed sludge is introduced into the sludge body in the retort, and the carbonaceous residue of the sludge is preferably withdrawn or removed from the retort at the opposite end of the same, at which opposite end the combustion gases are introduced into the retort. By suitably operating the retort and by suitably controlling the flow of the hot combustion gases and the feed sludge, the process may be practiced to controllably carry out the reactions in the retort in the various sections or zones thereof.

The main reaction between the organic matter of the sludge and the sulphuric acid content or compounds thereof in the sludge takes place in or about the middle reaction zone of the retort, although the evolution of $SO_2$ begins at the lower temperatures, the evolution taking place, however, with increasing power until the higher temperature range such as of the order of 380° to 420° F. is reached. The direct heating of the sludge body while the latter is in an agitated state accomplishes a uniform heat treatment and avoids local overheating with its consequent disadvantages in producing side reactions. The $SO_2$ gases produced are of high concentration and are generated free of any sublimed sulphur and substantially wholly free of $SO_3$ gas, sulphuric acid mist or $H_2S$ gas; and this generated $SO_2$ gas contains but a small amount of volatile oil and a minimum amount of light hydrocarbons which may be removed in the subsequent treatment of the gas by a simple form of condenser and scrubber. In the reaction zone at the lower temperature end of the retort evaporation of the water content of the sludge takes place (as well as distillation of the lighter hydrocarbons) to the point at which the sulphuric acid will react with the organic matter in the sludge. There results also here a sludge body having a sulphuric acid of high concentration into which the weak feed sludge is charged. In the reaction zone at the higher temperature end of the retort there takes place the final breaking up of the spongy carbonaceous residue of the sludge with further applied heating, the remainder of the $SO_2$ mechanically held in the residue being here driven off and the residue being reduced to the granular fuel product. The sludge mass during treatment in the various zones passes from a liquid stage to a plastic condition as it is progressively moved through the retort; and the fuel or carbonaceous residue does not quite lose this plastic condition, so that it is expelled from the retort in a cohering yet granular state. This character of the fuel product is in itself important because it avoids the formation of dust and the carrying over of dust with the produced gases; and the transformation of the sludge mass from the liquid stage to the plastic condition is also an important desideratum, since it is a factor not only in permitting the proper flow of the sludge mass through the retort, but in permitting the release of the reagents and the resulting products in and from the sludge, and furthermore permits the reaction to be carried out with homogeneity and uniformity.

In this process of treating acid sludge (or similar carbonaceous residues) it has been found, as aforesaid, that the reaction between the sulphuric acid content of the sludge and the carbon compounds therein takes place under the conditions of the process as a reaction between the sulphuric acid and compounds thereof in the sludge and some of the hydrocarbons which furnish the hydrogen required for the reduction of the sulphuric acid and compounds thereof. Due to the proven fact that in my process substantially no carbon dioxide, carbon monoxide, or hydrogen sulfide is produced in the process as aforestated, the reaction at the temperatures used is essentially one of reduction of sulphuric acid and its compounds by hydrogen from the hydrocarbons. This reduction might be effected in one or more of several ways, and I offer the following equations as an illustration of what I believe takes place although I do not wish to be bound by this explanation:

1. $C_2H_6 + H_2SO_4 = C_2H_4 + 2H_2O + SO_2$
2. $C_2H_4 + H_2SO_4 = C_2H_2 + 2H_2O + SO_2$
3. $C_2H_2 + H_2SO_4 = 2C + 2H_2O + SO_2$

It is to be understood that the hydrocarbon formulæ used in the above equations are used to represent types of hydrocarbons and not to represent the actual hydrocarbons which are the reactants in these sludges. It has been further found that the reactable components of the sulphur bodies comprise the free sulphuric acid in the sludge as well as certain compounds thereof and particularly the sulfides and disulfides. The sulphonic acids, however, are fairly stable high boiling compounds and probably do not liberate any $SO_2$ in this process. More specifically, alkyl sulphuric acids and alkyl sulfides or polysulfides yield sulphur as $SO_2$ in this process, whereas sulphonic acids do not appear to yield appreciable amounts of sulphur as $SO_2$ in this process.

I have empirically ascertained from the character of these reactions that where there exists an unbalance in or disproportion of the reactable hydrocarbon and sulphuric acid components in the sludge as practiced in this process, certain objections manifest themselves which I have further found may be efficaciously eliminated by balancing or adjusting the ratio or relative proportions of these reactable components. As the water is eliminated from the sludge in the retort, thereby increasing the concentration of the sulphuric acid, and as the sludge charge moves along in the kiln or retort with increasing concentration of the acid and under the influence of increasing temperatures, the rate of the reaction tends to accelerate and as the charge further moves along in the retort, the decreased mass of reacants tends to decrease the rate of the reaction. In the zone or zones where the main reaction and liberation of the $SO_2$ takes place, it has been found that if a large amount or proportion of oily hydrocarbons and a relatively small amount of sulphuric acid are present in the mixture, the reaction is retarded and the carbonaceous residue, instead of being free flowing, becomes comparatively sticky or gummy as the result of the presence in the sludge of the large amount or proportion of unreacted hydrocarbon. If, conversely, a large excess of sulphuric acid component or reactable compounds thereof and a relatively small amount of hydrocarbon are present in the mixture, the reaction is also retarded, undesirable higher temperatures and longer periods of time being required to completely reduce the sulphuric acid content or component in the sludge.

By means of the principles of the present invention, these difficulties may be avoided by balancing or adjusting the sludge on the basis of a predetermined ratio of reactable hydrocarbon and acid components so as to enable the process to proceed smoothly and regularly with the production of substantially the optimum amount and pure SO₂ gas at one end of the retort and a substantially dry acid-free and oil-free granular fuel at the other end. This adjustment or balancing may be made for sludges either too low or too high in acid content. If the sludge under treatment is of too low a sulphuric acid content, the adjustment of the acid-hydrocarbon ratio is made by the addition of free sulphuric acid to the sludge, which sulphuric acid may be obtained from the drying towers of the plant in a manner such as is disclosed in my aforesaid application Serial No. 574,244, filed November 11, 1931, or by the addition of free sulphuric acid from any other source, or by the addition of any acid-containing substances such as a high acid sludge from light oil refining. If the sludge to be treated contains, on the other hand, too high a sulphuric acid content, the adjustment of the acid-hydrocarbon ratio is made by the addition of other hydrocarbons, preferably those of low commercial value or of any low acid-containing sludge.

The exact adjustment of the ratio of the hydrocarbon and sulphuric acid components in the sludge depends in a large measure upon the nature of the hydrocarbons present, which varies in different sludges. In general, it may be stated that the best results are obtainable when the reactable sulphuric acid content in the sludge is between 30% and 45% and more generally between 30% and 60% of the sludge, within which range the reacting hydrocarbon content seems to be sufficient to complete the reaction and at the same time reduce the oily material in the sludge to the point at which it does not affect the physical condition of the fuel residue. The dividing line between the improper and the proper ratio within closer limits may be determined empirically by laboratory or plant scale tests for each particular sludge. Thus a sample of one type of sludge containing 78% sulphuric acid and a relatively low reacting hydrocarbon content when heated (by external heat) in a laboratory decomposer for 4 hours at a temperature of 250° C. liberated only 68% of its SO₂, and this sample of sludge required 10 hours of continuous heating and an elevation of the temperature to 280° C. to liberate 98% of its SO₂ on the basis of the sulphuric acid content. This sample of sludge requires an adjustment by the addition of other hydrocarbons. Another type of sludge when containing 38% of H₂SO₄ and heated in the decomposer to 255° C. for 3 hours showed a recovery of 108.5% SO₂, when containing 47% of H₂SO₄ and heated similarly to 288° C. showed a recovery of 101.0% SO₂, and when containing 54% H₂SO₄ and heated similarly to 230° C. showed a recovery of 90.4% SO₂, all calculated on the basis of the free H₂SO₄ content of the sludge. For this type of sludge the optimum ratio to be selected is that yielding 38% H₂SO₄.

An example of a sludge adjustment under practical operating conditions in the apparatus and process of my said copending applications may now be given. A hard, sticky, semi-liquid sludge from the plant of the Standard Oil Company of New Jersey at Bayway containing approximately 19% free sulphuric acid, and separating on standing approximately 15% of free oil, when processed in a plant such as disclosed in my aforesaid copending application Serial No. 568,050, produced a sticky, gummy, intermediate product in the retort which seriously interfered with the normal flow of the sludge material through the retort and which presented great difficulty in the disengagement or release of the SO₂ gas therefrom on account of the highly viscous character of the sludge. The carbonaceous residue obtained from treatment of this sludge was, moreover, wet and sticky due to the excess oily material in the sludge, which oily material escaped decomposition due to the relatively low acid content (19%) of the original sludge. To 600 pounds of this heavy sludge, there was added with thorough mixing 105.6 pounds of H₂SO₄ as 78% sulphuric acid which was taken from the drying tower, this mixing producing an adjusted or balanced sludge containing approximately 30% of free sulphuric acid. When this adjusted or balanced sludge was fed to the retort and operated under the conditions set forth in my said copending applications, no difficulty was experienced in the feeding of the adjusted mixture through the usual liquid feeding devices, the plant operated at full capacity, and no difficulty was experienced in the intermediate stages in the retort, the SO₂ gas being freely disengaged and liberated in optimum quantity from the solid or semi-solid intermediate product, and a granular acid-free oil-free solid fuel residue was obtained from the retort.

Where the sludge contains too high an amount or proportion of reactable sulphuric acid or compounds, it is desirable, as aforesaid, to select a hydrocarbon having the oily hydrocarbon constituent aforementioned or its equivalent. Other hydrocarbon products may be substituted for petroleum to secure the adjustment, and the character of such other hydrocarbon products may be readily ascertained by experiment. The following experiments will be illustrative. Sufficient water was added to 96.42% H₂SO₄ to make about 60° Baumé acid. The following mixture of sulphuric acid and a coal tar was heated in a stream of air: 4.2340 grams H₂SO₄ (×96.42× 65.32=2.6666 grams SO₂) +7 grams naval stores coal tar+2 cc. H₂O. This was heated to 210° C. in 30 minutes and at 210° to 260° C. for 3 hours. From this 1.8223 grams SO₂ or 68.2% of the amount added was collected. A second mixture of this sulphuric acid and bituminous coal was heated in a stream of air: 2.3510 grams H₂SO₄ (×96.42×65.32=1.4806 grams SO₂) +1 cc. H₂O+ 2 grams bituminous coal. This was heated to a temperature of 170° to 210° C. for 3 hours. From this 1.2821 grams SO₂, or 86.5% of the amount added, was recovered. Thus the coal tar was found not to be an especially good reducing agent, while the coal was found to be a good reducing agent for the sulphuric acid. In the first example the coal tar aromatic hydrocarbons probably form sulphonic acids which are stable at the treating temperatures, thus accounting for the relatively low recovery of the SO₂.

The practice of my improved process of treating the acid sludge will in the main be fully apparent from the above detailed description thereof. The sludge is adjusted or balanced so as to secure substantially complete recovery of the SO₂ gas from the reactable acid component therein and to secure simultaneously a production of a solid dry (oil-free) acid-free carbonaceous residue. This adjustment is made preferably by adding additional acid, oil or sludge of different composition to an acid sludge from which is recovered not only the acid and carbonaceous contents of the original sludge, but also those of the added material. The balancing of the reactable constituents improves the physical condition of the sludge by reducing it to a uniform, free flowing liquid condition, thereby facilitating the handling and feeding of the sludge to the sludge retort or kiln. By adjusting the ratio of hydro-reactable constituents, I am enabled to remove more of the oily hydrocarbons, thereby resulting in the production of a dry, oil-free as well as acid-free carbonaceous residue, and I am further enabled to reduce to the minimum amount the distillation of the volatile oil, thereby facilitating the subsequent treatment of the reaction gases. By the use of the invention, the capacity of the retort or decomposer is increased when the same is used for handling heavy, low-acid sludges as the primary raw material. Furthermore, the tendency to the gumming-up or balling-up of the reacting materials in the retort is effectively obviated, thus permitting the sludge mass during treatment to pass to the free flowing plastic condition as it progresses through the retort. The improvement in the physical condition of the sludge by reducing it to a uniform free flowing liquid condition is especially effective with a great many sludges which, while semi-liquid at high temperatures, are practically solid at normal temperatures and which sludges are obtained from highly developed cracking operations or from the treatment of certain heavy oils. Such sludges do not flow through pipe lines or valves, and such solid or plastic sludges constitute a substantial percentage of the sludge production of the United States which hitherto was considered as waste products and either put on the dump heap or in many cases burned as fuel or burned for disposal.

It will be further understood that while I have in the main described the practice of the principles of the present invention in connection with the improved method of treating sludge set forth in my copending applications, the process of my present invention may be widely varied to employ the underlying principles thereof and to effect any one or a number of the advantages flowing therefrom, all as I have attempted to define in the following claims.

I claim:

1. In the method of subjecting a hydrocarbon sulphuric acid sludge to heat treatment wherein the hydrocarbon acts to reduce the sulphuric acid or/and compounds thereof to $SO_2$, the steps of adjusting the ratio between the reactable hydrocarbons and sulphuric acid or/and its compounds in the sludge by adding to the sludge either a hydrocarbon body if said ratio is low or a sulphuric acid body if said ratio is high, and of subjecting the adjusted sludge to said heat treatment.

2. In the method of subjecting a hydrocarbon sulphuric acid sludge to heat treatment wherein the hydrocarbon acts to reduce the sulphuric acid or/and compounds thereof to $SO_2$, the steps of adjusting the ratio between the reactable hydrocarbons and sulphuric acid or/and its compounds in the sludge by adding to the sludge either a hydrocarbon body if said ratio is low or a sulphuric acid body if said ratio is high, and of directly subjecting the adjusted sludge to the treatment of hot combustion gases.

3. In the method of subjecting a hydrocarbon sulphuric acid sludge to heat treatment wherein the hydrocarbon acts to reduce the sulphuric acid or/and compounds thereof to $SO_2$, the steps of adjusting the ratio between the reactable hydrocarbons and sulphuric acid or/and its compounds in the sludge by adding either a hydrocarbon or a sulphuric acid body to the sludge so that the sulphuric acid content is of the order of from 30% to 60%, and of subjecting the adjusted sludge to said heat treatment.

4. In the method of subjecting a hydrocarbon sulphuric acid sludge to heat treatment wherein the hydrocarbon acts to reduce the sulphuric acid or/and compounds thereof to $SO_2$, the steps of adjusting the ratio between the reactable hydrocarbons and sulphuric acid or/and its compounds in the sludge by adding to the sludge either a hydrocarbon body if said ratio is low or a sulphuric acid body if said ratio is high, of subjecting the adjusted sludge to direct heat treatment to convert substantially all of the reactable sulphuric acid component to $SO_2$ and to produce a substantially acid-free carbonaceous granular residue.

5. In the method of subjecting a hydrocarbon sulphuric acid sludge to heat treatment wherein the hydrocarbon acts to reduce the sulphuric acid or/and compounds thereof to $SO_2$, the steps of adjusting the ratio between the reactable hydrocarbon and sulphuric acid components in the sludge by adding to the sludge either a hydrocarbon body if said ratio is low or a sulphuric acid body if said ratio is high, and of causing such components to react to reduce substantially all of the free sulphuric acid component to $SO_2$ and to produce a substantially acid-free carbonaceous residue.

6. The method of treating acid sludge which consists in adding either a hydrocarbon or sulphuric acid body to the sludge to adjust the ratio between the reactable hydrogen and sulphuric acid components in the sludge so that the sulphuric acid content of the sludge is from 30% to 60% thereof, and of causing the hydrogen and sulphuric acid components to react to reduce substantially all of the free sulphuric acid component to $SO_2$.

7. The method of treating an acid sludge low in acid content which consists in adding free sulphuric acid to the sludge to adjust the ratio between the reactable hydrocarbon and sulphuric acid components in the sludge, and of causing such components to react to reduce both the original and the added sulphuric acid component to $SO_2$ which is removed from the sphere of reaction.

8. The method of treating an acid sludge low in acid content which consists in adding free sulphuric acid to the sludge to adjust the ratio between the reactable hydrocarbon and sulphuric acid components in the sludge so that the sulphuric acid content is of the order of 30% to 60%, and of subjecting the adjusted sludge to the action of hot combustion gases at controlled temperatures to cause such components to react to reduce both the original and the added sulphuric acid component to $SO_2$ and to produce a substantially acid-free carbonaceous residue.

INGENUIN HECHENBLEIKNER.